United States Patent [19]

Stewart et al.

[11] 4,177,741

[45] Dec. 11, 1979

[54] SYSTEM AND METHOD FOR IMPROVING THE REACTION EFFICIENCY OF A FLUIDIZED BED

[75] Inventors: Robert D. Stewart, Verona; Robert L. Gamble, Wayne, both of N.J.

[73] Assignee: Foster Wheeler Energy Corporation, Livingston, N.J.

[21] Appl. No.: 916,997

[22] Filed: Jun. 19, 1978

[51] Int. Cl.² .................... F23D 1/00; F23B 7/00
[52] U.S. Cl. .................... 110/263; 110/342; 110/347
[58] Field of Search ............ 44/10 R; 432/58; 110/245, 263; 122/4 D

[56] References Cited

U.S. PATENT DOCUMENTS

| | | | |
|---|---|---|---|
| 2,706,706 | 4/1955 | Pettyjohn | 202/26 |
| 2,763,478 | 9/1956 | Parry | 432/58 |
| 2,789,034 | 4/1957 | Swaine et al. | 27/177 |
| 3,752,455 | 8/1973 | Zacpal et al. | 432/58 |
| 3,775,070 | 11/1973 | Messer et al. | 44/10 |
| 3,805,713 | 4/1974 | Notary et al. | 110/245 |
| 3,981,690 | 9/1976 | Chen et al. | 110/263 |
| 4,084,545 | 4/1978 | Nack et al. | 110/245 |
| 4,103,646 | 8/1978 | Yerushalmi et al. | 110/263 |

Primary Examiner—Kenneth W. Sprague
Attorney, Agent, or Firm—Marvin A. Naigur; John E. Wilson; John J. Herguth, Jr.

[57] ABSTRACT

A system and method for improving the reaction efficiency of a fluidized bed combustor or reactor in which a combustion supporting gas is passed upwardly through a bed of particulate material to fluidize same and to entrain the relatively fine particulate material in the bed. The entrained material is separated from the gas and is agglomerated externally of the housing before being passed back into the fluidized bed.

6 Claims, 1 Drawing Figure

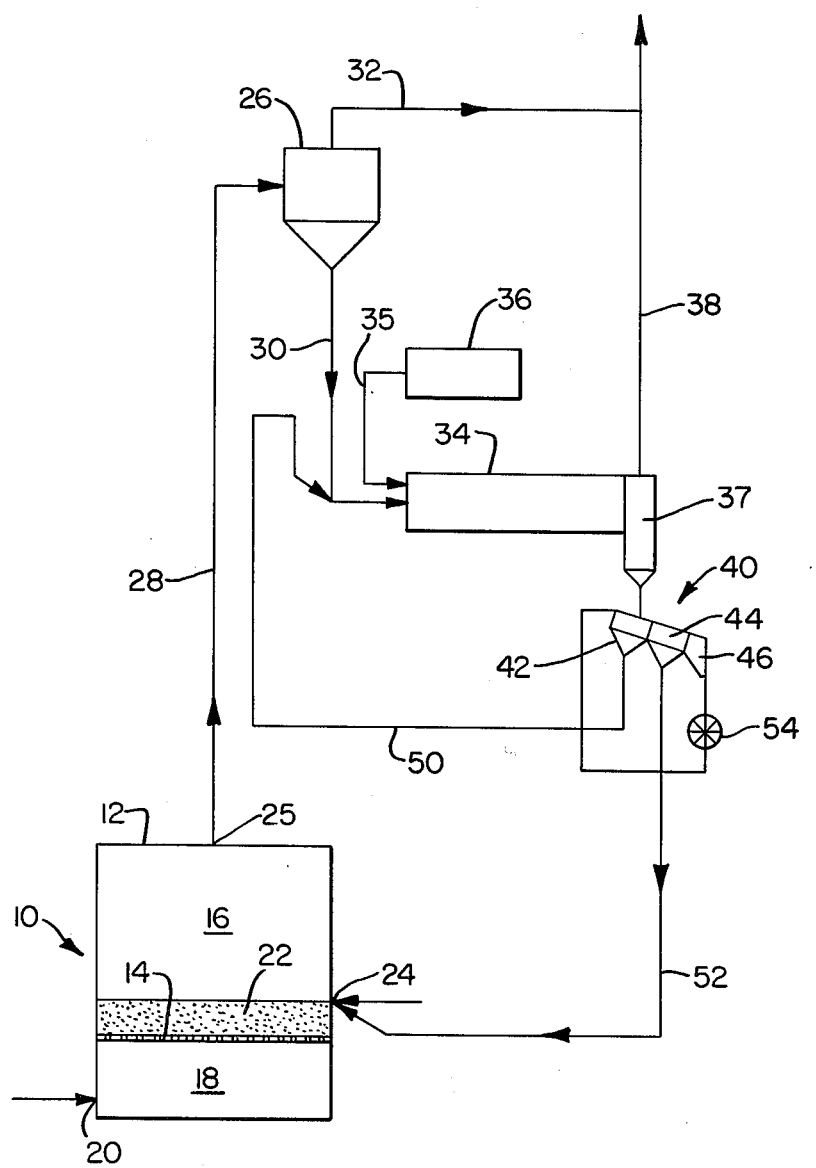

SYSTEM AND METHOD FOR IMPROVING THE REACTION EFFICIENCY OF A FLUIDIZED BED

BACKGROUND OF THE INVENTION

This invention relates to a fluidized bed combustor or reactor and, more particularly, to a system and method for improving the reaction efficiency of same.

The use of fluidized beds has long been recognized as an attractive means of generating heat. In these arrangements air is passed through a bed of particulate material which includes a mixture of inert material, a fuel material such as high sulfur, bituminous coal and, usually, adsorbent material for the sulfur formed as a result of the combustion of the coal. As a result of the air passing through the bed the bed is fluidized which promotes the combustion of the fuel. The basic advantages of such an arrangement are many and include a relatively high heat transfer rate, a substantially uniform bed temperature, combustion at relatively low temperatures, ease of handling the fuel materials, a reduction in corrosion and boiler fouling and a reduction in boiler size.

However, in these type of arrangements the quantity and velocity of the air supplied to the bed must be sufficient to maintain same in a fluidized condition and, as a result, a portion of the particulate bed material is entrained by the air passing through the bed and includes unreacted fuel material. In a great majority of the systems in use, the air passing through the bed along with the gaseous products of combustion and the particulate material entrained therein is passed to a dust collector, or the like, for separating the solids from the gases, and the solids are then discarded or passed to an external apparatus not connected with the fluidized bed process. Since a good percentage of the particulate material thus discarded contains unreacted solids, this lowers the potential reaction efficiency of the process.

SUMMARY OF THE INVENTION

It is therefore an object of the present invention to provide a system and method for generating heat utilizing a fluidized bed in which the reaction efficiency of the bed is increased.

It is a further object of the present invention to provide a system and method of the above type in which the entrained solid particulate material from the fluidized bed is separated from the gas in which it is entrained, is agglomerated into a solid particulate material of a larger size, and is returned back to the fluidized bed.

Toward the fulfillment of these and other objects the system of the present invention comprises a perforated plate disposed in a housing and supporting a bed of particulate fuel material. A combustion supporting gas is passed upwardly through the perforated plate to fluidize the particulate material and entrain the relative fine particulate material before discharging from the housing along with the gaseous products of combustion. The entrained particulate material is separated from the gas, and is agglomerated externally of the housing before being passed back to the bed.

BRIEF DESCRIPTION OF THE DRAWINGS

The above description, as well as further objects, features, and advantages of the present invention, will be more fully appreciated by reference to the following description of a presently-preferred but nonetheless illustrative embodiment in accordance with the present invention, when taken in connection with the accompanying drawing which is a schematic diagram of the system of the present invention.

DESCRIPTION OF THE PREFERRED EMBODIMENT

Referring specifically to the drawing the reference numeral 10 refers in general to a fluidized bed combustor/reactor which includes a housing 12 having an air distribution plate 14 disposed therein which divides the housing into an upper chamber 16 and a lower chamber 18. Air is introduced from an external source through an inlet 20 into the lower chamber 18 for passage upwardly through the plate 14 and into the upper chamber 16. A bed of particulate material, shown in general by the reference numeral 22, is disposed on the plate 14 and includes a mixture of crushed coal and an inert material such as a commercial grade hematite iron ore. Also, a fine limestone or dolomite can be included for use as an adsorbent for the sulfur formed during the combustion of the fuel.

Additional coal and limestone from an external source (not shown) is introduced into the bed 22 through an inlet 24 communicating with the upper chamber 16.

The air passing upwardly through the bed 22 in the housing 12 mixes with the gaseous products of combustion (with the resulting mixture hereinafter being referred to as gases) before passing out a suitable outlet 25 formed in the upper portion of the housing. In so passing the gases entrain a portion of the relatively fine particulate material in the bed 22 including unreacted fuel material.

A cyclone separator 26 is provided externally of the housing 12 and is connected to the outlet 25 via a suitable conduit system shown in general by the reference numeral 28. The cyclone separator 26 receives the gases from the outlet 25 and operates in a conventional manner to separate the finer portion of the entrained particulate material from the gases. The separated particulate material is then passed from the separator 26 via a duct 30 to an agglomerator 34 and the gases, along with a small portion of the particulate material that was not separated therefrom in the separator, are passed from the separator through a duct 32 for reasons to be described later.

The agglomerator 34 receives the particulate material from the separator 26 via the duct 30 and operates in a conventional manner to agglomerate same, that is to granulate or pelletize the materials into larger particles. In this context a duct 35 connects the agglomerator with a source 36 of a binder which may consist of water, petroleum fractions or other materials suitable for binding the particulate material into agglomerates. Since the particular agglomerating process, per se, does not form any part of the present invention it can be done by any conventional manner such as by granulation utilizing a pan or rotary drum, prilling effected in a dust bed, pelletizing, briquetting, or extrusion. As an example of one particular form of agglomerating process that is suitable for use in the present system, reference is made to copending patent application Ser. No. 856,554, filed Dec. 1, 1977, and assigned to the assignee of the present invention. It is understood, that the agglomerating technique will also include a setting or curing of the enlarged particles resulting from the agglomerating process.

The agglomerator 34 includes a separator 37 coextensive therewith which separates the relatively fine agglomerated particles out and passes them upwardly through a duct 38 which is in communication with the duct 32 from the separator 26. The resulting mixture of gases and relatively fine particulate materials passes externally of the system by the duct 38 for disposal or other uses.

The remaining agglomerated particles from the separator 37 of the agglomerator 34 passes down to a separator assembly, shown in general by the reference numeral 40 and including two separators 42 and 44, and a storage bin 46. The separator 42 receives the agglomerated materials from the separator 37 of the agglomerator 34 and operates to separate out those materials of a less than optimum size for use in the present process. A duct 50 connects the separator 42 back to the agglomerator 34 for recycling the latter materials, and the separator 44 of the assembly 40 receives the remaining agglomerated materials from the separator 42. The separator 44 passes the agglomerated materials of an optimum size, via a duct 52, back into the particulate fuel inlet 24 of the housing 12 of the combustor/reactor 10 for discharge into the fluidized bed 22. The oversized particles from the separator 44 are passed into the storage bin 46 and from the latter, through a grinder, or the like, 54 for reducing the size of these particles before they are passed back to the separator 42 of the assembly 40 for recycling as described above.

In operation the particulate fuel material in the bed 22 is ignited and air is passed into the inlet 20 of the chamber 18, where it passes through the plate 14 and the bed to fluidize the bed and promote the combustion of the particulate fuel material. The air passing through the fluidized bed 22 combines with the combustion gases from the fuel material in the bed and entrains the fine particles from the bed 22 as it passes into the upper portion of the chamber 16 and out from the outlet 25 in the upper portion of the housing 12. The gases and entrained particulate materials pass into and through the duct 28 and to the separator 26 which operates to separate the gases from a majority of the particulate material with the former passing, via the duct 32, to the vent duct 38 and the latter passing, via the duct 30 to the agglomerator 34.

The agglomerator 34 receives the particulate material from the duct 30 and the binder fron the duct 35 and operates to agglomerate a great portion of the material into larger size particles. The separator 37 of the agglomerator 34 collects the relatively fine materials from the agglomerator and pass them to the vent duct 38 with the remaining aggomerated materials being passed to the separator assembly 40. The assembly 40 operates to separate the relatively fine materials and relatively coarse materials from the agglomerated material with the fine materials passing, via a duct 50, back to the agglomerator 34, the optimum size material passing via a duct 52, back to the inlet 24 of the housing 12, and the course material passing through the grinder 54 and back to the separator 42.

The advantages of the foregoing are numerous. For example, the agglomerated larger sized particulate material passed back into the fluidized bed 22 will enjoy a longer residence time in the latter bed thereby improving the chances for complete reaction taking place and increasing their consumption or conversion in the bed. In addition, this technique will reduce the chances of plugging or malfunctioning of the solids handling equipment and will minimize hot spotting or the creation of deep reducing zones in the combustion and regeneration processes. Also the burning/reaction rate is reduced and the residence time of the particulate fuel material is increased.

It is understood that variations in the foregoing can be made without departing from the scope of the invention. For example, the duct 52 through which the agglomerated materials pass can be routed to a fluidized bed other than the bed 10 such as a carbon burn-up cell, a bed material regenerator, or other vessel.

Also, it is understood that in the event a sorbent for the particulate fuel material in the bed 22 is used such as limestone, dolomite, or the like, that the latter would be processed through separator 26, the agglomerator 34 and the separator assembly 40 in the identical manner to that discussed in connection with the particulate fuel material.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What is claimed is:

1. A system for improving the reaction efficiency of a fluidized bed combustor or reactor, comprising a housing, a perforated plate disposed in said housing and defining a chamber in said housing, means to introduce particulate material containing fuel into said chamber where it accumulates on said plate, means to pass a gas upwardly through a portion of the perforations in said plate and into said chamber to fluidize said particulate material, promote the combustion of said fuel material, and entrain the relative fine particulate material, outlet means formed in the upper portion of said housing for permitting said gas and entrained particulate material to discharge from said housing along with the gaseous products of combustion, means for separating said entrained particulate material from said gas, means disposed externally of said housing for receiving said particulate material from said separating means and for agglomerating same and means for passing the agglomerated particulate material back into said chamber.

2. The system of claim 1, further comprising additional separating means for receiving the agglomerated materials from said agglomerating means and for separating the relative fine and relatively coarse agglomerated materials from the optimum size materials before the latter are passed back into said chamber.

3. The system of claim 2, further comprising grinding means for receiving said relatively coarse materials from said additional separating means and for grinding said materials into smaller sizes and means for passing said latter materials back into said additional separating means.

4. A method for improving the reaction efficiency of a fluidized bed combustor or reactor, comprising the steps of passing a gas upwardly through a particulate material containing fuel disposed in a chamber to fluidize said particulate material, promote the combustion of said fuel material and entrain the relative fine particulate material, permitting said gas and entrained particulate material to discharge from said housing along with the gaseous products of combustion, separating said entrained particulate material from said gas, agglomerating said particulate material externally of said housing, and passing the agglomerated particulate material back into said chamber.

5. The method of claim 4, further comprising the step of separating the relative fine and relatively coarse agglomerated material from the optimum size material before the latter is passed back into said chamber.

6. The method of claim 5, further comprising the step of grinding said relatively coarse material after it has been separated.

* * * * *